United States Patent Office 2,917,565
Patented Dec. 15, 1959

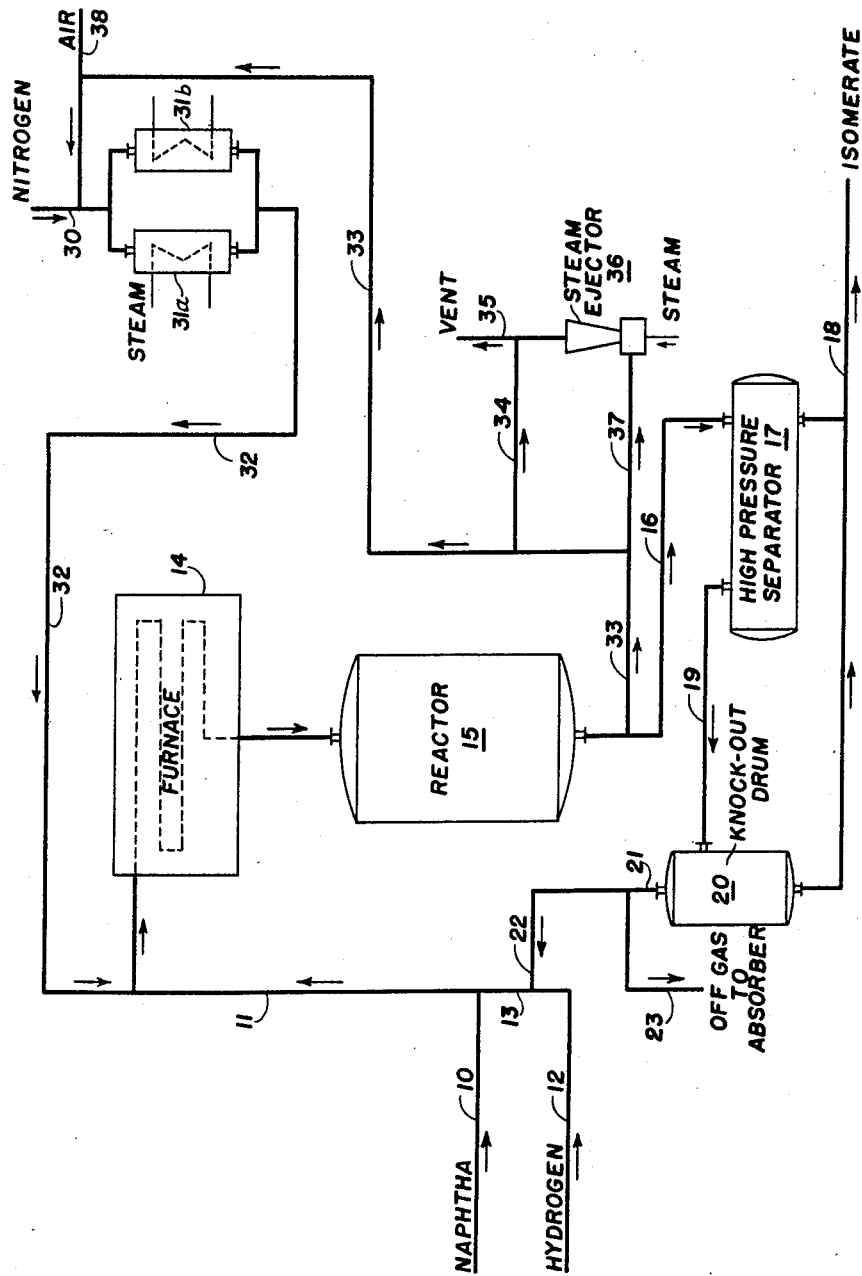

2,917,565

ISOMERIZATION OF PARAFFINIC HYDROCARBONS AND METHOD OF ACTIVATING THE ISOMERIZATION CATALYST

Norman L. Carr, Crystal Lake, Ill., assignor to The Pure Oil Company, Chicago, Ill., a corporation of Ohio Application October 31, 1956, Serial No. 619,376

15 Claims. (Cl. 260—683.65)

This invention relates to a process for conditioning a silica-alumina catalyst promoted with a hydrogenation catalyst to produce and maintain high isomerization activity. It more specifically relates to the preparation of catalyst and a process for the isomerization of saturated aliphatic and alicyclic hydrocarbons. This application is a continuation-in-part of patent application Serial No. 551,854 filed December 8, 1955, now abandoned.

In addition to having the requisite selectivity, and mechanical strength, it is required that a satisfactory catalyst also have an adequate lifetime. Even when a catalyst is active and selective, not all the conditions which must be fulfilled in industrial practice are complied with. Frequently, catalyst compositions will be developed which will have these attributes; however, they do not become commercially acceptable because their activity rapidly and permanently degenerates to a state where the catalyst cannot be reactivated to initial activity. Adequate lifetime is necessary because this fixes the cost of replacement by fresh catalysts needed for a given production figure. It is, therefore, necessary that either the catalysts give a high yield of product per unit of catalyst before such degeneration occurs, or the catalyst must be susceptible to regeneration in a simple regeneratory system complementary to the process so that, in effect, the total lifetime of the catalyst is sufficient.

As catalysts for use in isomerization processes employed in upgrading mixtures of saturated aliphatic and/or alicyclic light hydrocarbons, such as straight-run petroleum naphtha distillates, to provide high octane number gasoline blending agents, it has been found that composites of cracking catalysts and hydrogenation catalysts are highly active and selective (Vide Isomerization of Saturated Hydrocarbons in Presence of Hydrogenation-Cracking Catalysts, Ciapetta et al., Ind. & Eng. Chem. 45 (1), 147, et seq.). Specific catalysts are prepared by incorporating a small amount of a hydrogenation agent in a refractory, mixed-oxides base composited to evince acidic properties and hydrocarbon cracking activity. Suitable hydrogenation agents include the oxides of, or elemental, group VI or group VIII metals, such as iron, platinum, cobalt, nickel, or their salts, including molybdates, tungstates, chromates, borates, as well as oxides of chromium, molybdenum, tungsten, and uranium, alone or in admixture. However, these catalysts are susceptible to permanent loss in activity as a result of shutdown or other inter-run incidents. According to this invention, it has been found that these catalysts must be preconditioned prior to use as isomerization catalysts to enhance their stability and avoid these disadvantageous characteristics. As an important incident to the preconditioning process of this invention there is effected an enhancement in the activity of the catalyst.

It is, therefore, a primary object of this invention to provide a means for conditioning an isomerization catalyst composition comprising a refractory, mixed-oxides base composited to evince acidic properties and hydrocarbon cracking activity, having incorporated therein a hydrogenation agent to provide a composite catalyst of increased stability and high activity. It is another object of this invention to provide a high activity catalyst and a process for the isomerization of saturated hydrocarbons. These and other objects will become more apparent from the following detailed description of this invention.

Figure 1 is a schematic representation of a typical reaction system employed in the process of this invention.

According to the process of this invention, it has been found that an isomerization catalyst, comprising a hydrogenation agent supported on a refractory, mixed-oxides base composited to evince acidic properties and hydrocarbon cracking activity, may be conditioned prior to use in a catalytic process by means of a plural-step preconditioning process employing a sequential oxidation and hydrogenation treatment. Essentially, the conditioning process which has been found to be uniquely effective may be divided into two parts, viz., (a) the catalyst preparation carried out in accordance with the prior art, and (b) the preconditioning steps which have been found to be exceptionally and distinctively effective for inducing high activity and stability by imparting resistance to permanent depreciation in activity. The essentials of these procedures, or steps, follow:

(a) *Catalyst preparation.*—The first step necessary in carrying out the invention is to prepare a refractory, mixed-oxides base composited to evince acidic properties and hydrocarbon cracking activity, and incorporating in the catalyst base small amounts of a hydrogenation component, e.g., oxides and salts of, or elemental, group VI or VIII metals. A variety of methods has been devised and is described in the prior art for preparing the composite catalysts used in the process of this invention. For example, catalysts employing silica-alumina as the refractory, mixed-oxides base and having incorporated therein metallic group VIII metals may be prepared by impregnating the silica-alumina carrier with a solution of a soluble group VIII metal salt, such as the sulfate, acetate, chloride, nitrate, or complex group VIII metal ammonium compounds, or the molten salt may be employed in impregnating the silica-alumina carrier. The metallic group VIII metal is then produced by reducing the compounds with a reducing gas, such as hydrogen, carbon monoxide, hydrocarbons, etc. Another technique involves the admixing of a solution of a group VIII metal salt with the silica-alumina carrier. A group VIII metal hydroxide or carbonate is then precipitated to effect the impregnation of the silica-alumina. The resultant admixture is then filtered and the impregnated silica-alumina washed free of soluble salts and dried, after which the metallic group VIII metal is produced by a reduction of the hydroxide or carbonate. In certain instances, it may be preferred to first convert the impregnated group VIII metal compound to the oxide by heating it in a suitable oxidizing atmosphere prior to reduction to the metallic group VIII metal. A more recent technique for the preparation of a silica-alumina catalyst, having incorporated therein a highly active, hydrogenation component, involves impregnating silica-alumina with a complex group VIII metal ammonium salt solution, and thereafter contacting the impregnated silica-alumina with carbon dioxide to produce the carbonate. The impregnated carrier is then dried and calcined at a temperature at which the carbonate will decompose to form the oxide, after which the oxide is subjected to reduction to form the metallic catalyst. It is essential in preparing catalysts of this nature, wherein an ammonium compound is employed in the catalyst preparation, that reducing conditions of time and temperature sufficient to effect the substantially complete removal of ammonium ions from the catalyst be employed in order to avoid adversely affecting catalyst activity. The silica-alumina carrier may be prepared by admixing separately prepared proportions of silica gel and alumina gel or may be manufactured by conventional co-precipitation techniques. It is also possible to prepare a catalyst which may be employed in the instant invention by contacting silica gel particles with a solution of aluminum and group VIII metal salts of the desired concentrations. After drying the mixture, it is heated for a time sufficient to effect the decomposition of the salts. Thereafter the group VIII metal is reduced to the metallic state by treatment with hydrogen at an elevated temperature. Other methods for preparing silica-alumina group VIII metal compositions may also be employed. Similarly, preparation of the group VI or group VIII metal oxide- or salt-containing silica-alumina composites can be effected according to conventional catalyst synthesis techniques wherein the finishing step involves exposing the catalyst composition to a hydrogen atmosphere. Although the catalyst compositions of this nature, such as silica-alumina-nickel tungstate, tungsten oxide, etc. are prepared according to conventional techniques involving the impregnation of the silica-alumina carrier with the group VI or group VIII metal oxide or salt, isomerization catalysts subjected to the pre-conditioning technique of this invention are exposed to a reducing atmosphere as the final step of the catalyst preparation prior to preconditioning. Accordingly, in the catalyst prepared in this manner, the hydrogenation agent will be reduced and the final composition will contain the hydrogenation agent in its reduced form, which may or may not be the form in which the hydrogenation agent was originally introduced into the silica-alumina carrier. The reduction of the silica-alumina catalyst having incorporated therein a group VI or group VIII metal oxide or salt is carried out substantially in the same manner as that employed in incorporating a metallic group VIII hydrogenation agent into the silica-alumina carrier. It is sufficient for the purposes of this invention that any techniques for the preparation of a catalyst composition of this nature be employed. However, regardless of the synthesis which is utilized, it is desirable to substantially free the composition of any materials, such as ammonium ions, which will deleteriously affect the activity of the composition. After the silica-alumina-hydrogenation agent composite catalyst has been prepared, it is then subjected to the preconditioning technique, which is the principal feature of the instant invention. Although the foregoing discussion is directed specifically to the use of silica-alumina, other refractory oxides of this type can be used and the various techniques for incorporating the hydrogenation agent adapted accordingly.

(b) *Preconditioning.*—In carrying out the preconditioning phase of the subject process, the refractory, mixed-oxides base, composited to evince acidic properties and hydrocarbon cracking activity, containing the hydrogenation agent is subjected to an oxidizing atmosphere maintained at a temperature of about 650° to 750° F. Following this oxidation, the oxidized catalyst is contacted with hydrogen, at the same temperature as that at which the oxidation was carried out, to reduce the reducible elements of the composition and produce a composite catalyst of high reactivity and resistance to degeneration. Catalysts preconditioned in this manner prior to use also have the highly distinctive and important feature of being more active than those not preconditioned in accordance with this invention, as well as being more susceptible to regeneration to produce reactivated catalysts having substantially the same high activity level as the catalyst originally prepared.

The process of this invention may be employed for preconditioning catalysts especially adaptable as isomerization catalysts used in promoting the molecular rearrangement of saturated hydrocarbons or mixtures thereof, such as light petroleum distillates boiling in the naphtha range. Accordingly, the instant invention is further illustrated by the following non-limiting and illustrative examples of the catalyst-conditioning process of this invention as employed in a conventional isomerization process.

A silica-alumina catalyst in the form of one-eighth inch pellets and having the following composition.

| Composition: | Weight percent |
|---|---|
| $Al_2O_3$ | 24.4 |
| $Na_2O$ | 0.021 |
| $SO_4$ | 0.25 |
| Fe | 0.025 |
| $SiO_2$ | 75.3 | was impregnated with 5% nickel, based on the finished catalyst, according to conventional, prior art, catalyst preparation practice. This catalyst was employed in an activity rating test without further treatment. A synthetic feed stock having a research octane number of 45 was prepared for use in the activity rating test by blending the following constituents.

| Component: | Volume percent |
|---|---|
| Normal pentane | 27.9 |
| Normal hexane | 26.5 |
| Normal heptane | 25.6 |
| Cyclohexane | 20.0 |

This feed stock was processed in the presence of the above-described catalyst under conventional isomerization conditions. The run conditions and results of this run are shown in Table I:

TABLE I

| | |
|---|---|
| Temperature, ° F. | 660 |
| Pressure, p.s.i.g. | 350 |
| Liquid volumetric hourly space velocity | 1 |
| $H_2$/hydrocarbon mole ratio | 3.5 |
| Duration of run, hr. | 1 |
| Research octane number (clear) of liquid product (catalyst activity rating) | 64.0 |
| Liquid recovery, vol. percent | 96 |

To provide a criterion for comparative studies, catalyst activity ratings were used. The ratings were defined as the research octane number of the liquid product obtained from the isomerization process with the reactor temperature at 660° F. The isomerization processing conditions were constant as follows.

(1) Charge: the synthetic mixture hereinbefore described.
(2) $H_2$/hydrocarbon mole ratio: 3.5/1.
(3) Reactor pressure: 350 p.s.i.g.
(4) 20″ catalyst bed depth.
(5) LVHSV: 1.0.
(6) The reactor was a 1″ pipe containing a fixed bed of catalyst and operated in an isothermal manner with down-flow of the charge mixture.

To illustrate the subject invention, about 400 g. of finished catalyst, comprising 5% nickel on a particular silica-alumina support, were prepared as follows:

*Catalyst preparation*

Ninety-six g. of $Ni(NO_3)_2 \cdot 6H_2O$ were dissolved in 250 ml. of distilled water at about room temperature. To this solution were added 380 g. of fresh (virgin) silica-alumina (dry-basis) catalyst of the commercial cracking type, having the following characteristics.

| Component: | Wt. percent |
|---|---|
| $Al_2O_3$ | 24.4. |
| $Na_2O$ | 0.02. |
| $SO_4$ | 0.25. |
| Fe | 0.03. |
| $SiO_2$ | 75.3. |
| Surface area | 440 m.²/g. |
| Pore volume | 0.71 ml./g. |
| Particle density | 0.88 g./ml. |

The catalyst particles were microspheroidal, as produced for use in fluidized systems. The addition of the solid silica-alumina catalyst to the solution was accompanied with vigorous mixing, thereby producing a slurry. Five hundred ml. of 1.84 N ammonium carbonate solution was admixed with the slurry, and the resulting admixture was stirred for about 15 minutes, filtered, and dried in an oven at 220° F. for 16 hours. The amount of $(NH_4)_2CO_3$ used in this preparation corresponded to about 40% excess of the theoretical amount needed to form $NiCO_3$. The dried catalyst was agglomerated in a conventional pelleting machine to form one-eighth inch by one-eighth inch cylindrical pellets. The pelleting was carried out under conditions such that the bulk density of the pellets was 0.55 to 0.65 g./ml.

The dried catalyst (236 ml., or 186.4 g.) having a bulk density of 0.77 g./ml. and a surface area of 285 m.²/g., was charged to a reactor which was enclosed in a furnace initially at room temperature. A flow of 10 c.f.h. of purified hydrogen at 1 atm. was started through the catalyst bed. The hydrogen was purified by passing it over 200 g. of nickel-silica-alumina catalyst contained in a furnace at 650° F. and 350 p.s.i.g. The furnace was followed by a dryer. The following table gives the time-temperature schedule of the treatment of the catalyst.

| Hour | Temperatures, ° F. | | $H_2$ Rate, cu. ft./hr. |
|---|---|---|---|
| | Mid-Reactor | Mid-Block | |
| 0 | 80 | 80 | 10 |
| | 100 | 135 | 10 |
| | 350 | 390 | 10 |
| | 470 | 490 | 10 |
| 1.33 | 490 | 493 | 10 |
| | 520 | 525 | 10 |
| | 515 | 516 | 10 |
| 3.33 | 585 | 600 | 10 |
| | 625 | 645 | 10 |
| 4.33 | 682 | 709 | 10 |
| | 755 | 762 | 10 |
| 5.33 | 800 | 816 | 10 |
| | 873 | 891 | 10 |
| 6.00 | 925 | 952 | 10 |
| | 940 | 961 | 10 |
| | 965 | 977 | 10 |
| 6.75 | 970±10 | 980±10 | 4 |
| | 970 | 982 | 4 |
| 23.50 | 970 | 978 | 4 |

*Preconditioning*

After the foregoing initial activation was completed, the reactor heaters were turned off and the furnace-reactor system was cooled. After about 2 hours, the block temperature reached about 715° F. The system was purged with dry nitrogen at 10 c.f.h. for 15 minutes. Dry air then was admitted to the reactor at a rate of 3.0 c.f.h. and 1 atm. pressure. The following table presents the time-temperature-position data.

| Time, Min. | Temp., ° F., at position in bed | | | Mid-Block Temperature, ° F. |
|---|---|---|---|---|
| | 0″ (top) | 7″ | 13″ | |
| 0 | 671 | 701 | 712 | 706 |
| 0.5 | 675 | 701 | 712 | 706 |
| 1 | 680 | 701 | 712 | 706 |
| 1.5 | 675 | 720 | 712 | 706 |
| 2 | 675 | 750 | 714 | 706 |
| 2.5 | | 766 | 740 | 706 |
| 3.0 | | [1]771 | 761 | 706 |
| 3.5 | | [1]771 | 771 | 706 |
| 4 | | 763 | [1]772 | 706 |
| 5 | 671 | 751 | 767 | 706 |
| 10 | 671 | 710 | 725 | 706 |

[1] Peak temperatures.

After the hot zone disappeared, the flow of air was continued for 5 minutes. The system was then nitrogen-purged, at 10 c.f.h., for 5 minutes. Thereafter, hydrogen was admitted to the reactor at 4.0 c.f.h. and 1 atm. pressure. The average reactor temperature was about 706° F. before the hydrogen was admitted. Within 30 seconds the entire bed temperature increased 25° F. because of the exothermic heat effect. Within 3 minutes the reactor temperature was back to the 706° F. level. Ten minutes after hydrogen was admitted, the unit was pressured with hydrogen to 350 p.s.i.g. with a flow of 4 c.f.h. through the unit until time for the run This preconditioned catalyst was contacted with the hereinbefore-described standard feed stock and hydrogen as the reactor charge Steady state conditions were established before process data were taken.

| | |
|---|---|
| Run period | 1 |
| Process time, hr. | 1.0 |
| Avg. reactor temp., ° F. | 648 |
| Avg. mid-block temp., ° F. | 648 |
| Space velocity, LVHSV | 1.08 |
| $H_2$ rate, c.f.h. | 4.6 |
| Pressure, p.s.i.g | 350 |
| Charge rate, g./hr. | 147.6 |
| Product rate, g./hr. | 136 |
| Liq. recovery, vol. percent | 95.1 |
| Liquid data: | |
| $n_D^{20}$ | 1.3740 |
| ° API | 81.4 |
| Gas data: | |
| Sc.f.h. | 4.55 |
| Sp. gr. (air=1.0) | 0.14 |
| Material balance, percent | 100.1 |
| Product R.O.N., clear (CFRR) | 71.2 |
| Charge R.O.N., clear | 48 |
| Catalyst activity rating (run at 660° F.) | 75 |

It is seen from the foregoing specific examples that a substantial improvement in the activity of the catalyst was obtained by employing the preconditioning process described in the instant invention.

In the foregoing examples, the hydrogen which was employed was substantially free from impurities, and contained not more than about 0.005 mole percent of $O_2$ and about 0.003 mole percent of CO. The use of high-purity hydrogen facilitates the preconditioning technique of this invention. Any process which will substantially free the hydrogen from impurities, especially $H_2O$, $O_2$ and CO, can be employed. In carrying out the investigation of the instant invention, it has been found that substantially all of the oxygen and carbon monoxide can be removed from the reducing gas by contacting the hydrogen with a catalyst comprising 5% nickel incorporated in a commercial cracking catalyst. By carrying out the process at a temperature of about 400 to 700° F. and a pressure of about 200 to 500 p.s.i.g., a gaseous effluent is produced which, after being subjected to dehydration, can effectively be employed in carrying out the preconditioning process of this invention. In the event that hydrogen of high purity cannot be obtained, the virgin, composite catalysts, consisting of a mixed-oxides base, evincing acidic properties and activity for cracking, supporting a component active for hydrogenation, can be preconditioned to produce catalysts of high activity by modifying the oxidation-reduction, preconditioning technique described above. Where hydrogen containing oxygen and carbon monoxide in amounts in excess of those quantities which can be tolerated are employed, it is necessary to employ the following preconditioning steps:

(1) Contact the virgin catalyst with an oxidizing medium at a temperature of about 650–700° F.

(2) Evacuate the system to an absolute, sub-atmospheric pressure of not more than about 10 mm. of mercury while maintaining the system at the same temperature as that employed in the oxidation step.

(3) Thereafter, admit hydrogen into the system, and raise the system pressure to atmospheric pressure or to operating pressure to effect the reduction of the group VIII component of the catalyst.

The enhancement in activity of catalysts of this invention, obtained by employing the sub-atmospheric pressure modification of the oxidation-reduction preconditioning technique of this invention, is shown by the following example wherein the silica-alumina-5% nickel catalyst composite was prepared using pre-run conditions consisting of virgin activation, air oxidation at 650°–690° F., evacuation, and hydrogen reduction at about 650° F. The results of this run are summarized in Table II.

TABLE II

| Charge stock: | Standard charge described above |
|---|---|
| $H_2$ rate, s.c.f.h. | 4.0. |
| Space velocity, LVHSV | 1. |
| Average temperature, °F. | 652. |
| Process period | 1 hour. |
| R.O.N. clear | 68. |
| Catalyst activity rating | 71. |

In addition to possessing high activity, catalysts preconditioned in accordance with the instant invention are resistant to degeneration resulting from standard shut-down procedures or other inter-run conditions. By employing the oxidation-reduction preconditioning technique, silica-alumina-hydrogenation agent composite catalysts can be regenerated to produce catalysts having activities substantially the same as that of the fresh, unused catalyst. This feature of the invention is illustrated by the following illustrative but non-limiting examples:

The catalyst employed was a silica-alumina-5% nickel composition prepared in accordance with this invention. Using standard operating conditions and a typical naphtha, the run was carried out until the catalyst activity rating decreased to 57. After a normal shut-down, the catalyst system was heated up to about 1000° F. in the presence of hydrogen. A hydrogen flow of about 0.5 cubic foot per hour was continued over the catalyst for a period of about 10 hours at this same temperature level. After cooling the system to about 750° F. with proper purging, the catalyst was oxidized with air for about 15 minutes, during which time the reactor temperatures rose to about 850° F. Following a nitrogen purge, the catalyst was reduced at about 750° F. The system was then pressured and cooled to run temperatures.

Again operating at standard test conditions and a reactor temperature of about 658° F., the product octane number was 68.0. Operating at 676° F. for the second period, the octane number of the product was 73.2. This corresponds to a catalyst activity rating of about 69 units. The octane number of the charge had been improved 20 and 25 units, respectively. The activity rating was less than two units below that expected for virgin activity of this catalyst.

In carrying out the oxidation-reduction preconditioning, it has been found necessary that the temperature be maintained between about 650° to 850° F. to obtain maximum activity. At preconditioning temperatures below or above this range of temperatures, it has been found that the increase in activity of the catalyst is minimized. For example, when the preconditioning oxidation and reduction temperatures were in the range 960°–975° F., the resulting catalyst activity rating was 60. Using 500° F. as the preconditioning temperature, the catalyst was oxidized, evacuated and reduced with a resulting catalyst activity rating of 63, or below the optimum. During the oxidation step of the preconditioning procedure any gaseous oxidizing agent, such as air or oxygen, can be employed. In carrying out the oxidation step, the rate at which the oxidizing agent is passed over the catalyst is selected to control and regulate the peak catalyst temperature. The oxidation is continued at least long enough for the hot-zone or peak catalyst temperature to pass through the bed. This normally requires from one-fourth to one hour, but longer periods may be necessary in certain instances. In general, the functional variables affecting the time required for oxidation, i.e. completion of oxidation reactions, are as follows:

(a) Bed depth of reactor.
(b) Rate of reaction (dependent upon temperature).
(c) Physical parameters of the solid and regeneration gas system.
(d) Concentration of limiting reactant in feed gas, such as $O_2$.
(e) Amount of reacting deposit on the solid, such as coke and nickel.
(f) Regeneration gas velocity.

After oxidation, most of the hydrogenation agent is in the oxidized form. After carrying out the reduction step of the preconditioning, most of the hydrogenation agent is in its most reduced form with a possibility that some of the oxidized hydrogenation agent is not substantially reduced. The reducing medium used is hydrogen, essentially free of $H_2O$, $O_2$ and CO. Other impurities, such as light hydrocarbons, are not detrimental, nor are inert gases such as $N_2$, He, $CO_2$, etc. As has been pointed out, $H_2O$, $O_2$, CO, $H_2S$ and related compounds, including those which react under reduction conditions to form the above, should be excluded where possible, although traces of these substances can be tolerated. As in the oxidation step, the temperature range over which optimum results are obtained is from 650° to 850° F. While the hydrogen rates used during the reduction step may be in the range of 2,000–5,000 s.c.f.h./bbl. of catalyst, these rates are not critical, and any practical rate is permissible. Normally, the pressure is increased to reaction level as the hydrogen is introduced. Attendant with the reduction operation there is an exothermic heat effect. The hot-zone produced, which is usually 10° to 50° F. higher than the initial catalyst temperature, travels through the bed at a fast rate. The time of reduction is dependent upon the same factors, in an analogous sense, as were described with respect to time of oxidation. As soon as the reactor system is at operating conditions, charging of the hydrocarbon feed may be initiated.

When the preconditioning involves evacuation following oxidation, it is important that the catalyst be well purged with an inert gas, such as nitrogen substantially free of CO and $O_2$, to decrease the $O_2$ content (from air oxidation) of the gas contained in the reactor to the trace level. Generally, 10 to 15 minutes with an inert gas rate of 1,000–6,000 s.c.f.h./bbl. of catalyst, are sufficient. In the event evacuation is employed between the oxidation and reduction steps, the pressure level of the reactor is the limiting factor. It has been found that a pressure reduction to 10 mm. of mercury, absolute, is sufficient. It is believed that this pressure reduction removes interstitial, occluded and adsorbed oxygen and water from the reactor voids and from the catalyst. Regardless of any postulated mechanism, this expedient is necessary where impure $H_2$, as defined above, is employed in the preconditioning.

Catalysts which may be treated in accordance with the instant invention are those which comprise a refractory, mixed-oxides base, composited to evince acidic properties and hydrocarbon cracking activity, having incorporated therein 2 to 8% of a hydrogenation agent, such as group VIII metals; oxides of polyvalent metals of groups V, VI and VII; or group VIII metal salts of oxyacids of polyvalent metals of groups V, VI, and VII. Specific examples of the refractory, mixed-oxides base include but are not limited to $SiO_2$—$Al_2O_3$, $SiO_2$—$ZrO_2$, $SiO_2$—$TiO_2$, $SiO_2$—$B_2O_3$, $Al_2O_3$—$ZrO_2$, $Al_2O_3$—BeO, $$Al_2O_3\text{—}B_2O_3, \; SiO_2\text{—}CrO, \; B_2O_3\text{—}TiO_2$$

$SiO_2$—$Al_2O_3$—$ZrO_2$, $SiO_2$—$Al_2O_3$—BeO, and acid treated clays. In forming the base, these mixed oxides may be either chemically or physically combined. Specific examples of suitable hydrogenation agents include, but are not limited to, cobalt, nickel, platinum, tungsten oxide, molybdenum oxide, chromium oxide, manganese oxide, and vanadium oxide; and cobalt, nickel, and platinum salts of the oxy-acids of tungsten, molybdenum, chromium, vanadium, or manganese, e.g., nickel tungstate, cobalt molybdate, nickel molybdate, etc. It has been found that catalyst carriers containing 50 to 87% silica, 50 to 13% alumina, having incorporated therein 3 to 5% of the hydrogenation agent, have superior activities and are preferred. It is also preferred that nickel or nickel compounds be used in formulating the catalyst treated in accordance with this invention to provide the best results in isomerization processes wherein the following ranges of conditions are employed:

| | Range | Range Preferred |
|---|---|---|
| Temperature, °F | 600–750 | 650–700 |
| Pressure, p.s.i.g. | 50–1,000 | 300–500 |
| Mole Ratio, Hydrogen/Hydrocarbon | 0.5–6.0/1 | 2–4/1 |
| Liquid Hourly Space Velocity (LVHSV) | 0.1–2.0 | 0.5–1.2 |

It is also desirable to utilize silica-alumina carriers wherein the ratio of $SiO_2$ to $Al_2O_3$ is less than about 75 to 25. One of the advantages of maintaining these ratios is seen in Table III, wherein is shown extended life for catalyst compositions within this range.

TABLE III

LENGTH OF ACTIVE LIFE COMPARISON

[Feedstock: Light straight-run naphtha having a boiling range of 95° to 205° F., fractionated from a Mid-Continent crude oil. The feed contained about 12% n-pentane and had a clear R.O.N. of 66.4 and sulfur content of 0.003% by weight.]

Operating Conditions:
 Pressure=350 p.s.i.g.
 Space velocity=1.0 LV./H./VC.
 $H_2$ mole ratio=1–2

| Catalyst | Low Alumina [1] | High Alumina [2] | |
|---|---|---|---|
| Reaction Temperature, °F | 670 | 670 | 635 |
| Liquid Recovery, percent vol | 94 | 95 | 95 |
| R.O.N. at: | | | |
| 2 hrs | | | 76.4 |
| 4 hrs | 72.4 | | |
| 8 hrs | | 79.6 | 77.2 |
| 24 hrs | | | 77.2 |
| 36 hrs | 71.2 | | 76.4 |
| 60 hrs | | 78.0 | 77.2 |
| 70 hrs | | | 76.0 |

[1] Preconditioned catalyst consisting essentially of 5% Ni on an 87/13 silica-alumina carrier.
[2] Preconditioned catalyst consisting essentially of 5% Ni on a 75/25 silica-alumina carrier available from the Davison Chemical Company (See O. & G. J., October 17, 1955, for résumé of typical properties.)

The activity of the catalyst compositions prepared in accordance with this invention is affected by size of the aggregate catalyst mass, or pellets. It has been observed that activity increases with decreasing pellet size. For example, the activity rating of a silica-alumina-nickel catalyst which was formed into 3/16 x 3/16 inch pellets and preconditioned in accordance with this invention was about 4 units lower than a catalyst similarly prepared, but in the form of 1/8 x 1/8 inch pellets.

In carrying out an isomerization process of this nature, low-boiling, saturated-hydrocarbon-containing feed stocks are employed. Such stocks include normal paraffins containing not more than about 8 carbon atoms per molecule, or naphthenic hydrocarbons, as well as straight-run, light petroleum distillates boiling between about 95–250° F., which contain these saturated isomerizable hydrocarbons.

In carrying out the process, conventional contact equipment and product recovery systems can be employed. A typical installation is shown in the single figure. A light naphtha distillate, rich in saturated hydrocarbons is passed via lines 10 and 11 to furnace 14. Hydrogen, admitted to the system through line 12, is admixed with the naphtha feed by means of line 13, and the combined feed is heated to reaction temperature in furnace 14 before being introduced into reactor 15. The reaction effluent leaves reactor 15 in line 16 and is sent to high pressure separator 17 to effect a separation of the isomerate, which is discharged from the reaction system through line 18, from the off-gas, which leaves separator 17 by means of line 19 and is sent to knock-out drum 20 wherein any entrained isomerate is recovered. The gaseous effluent is withdrawn through line 21. Because this effluent is rich in hydrogen, provisions are made for recycling a portion of this gas to the reactor by means of line 22 which interconnects with hydrogen feed line 13. The gas which is not used for recycle operation is passed via line 23 to an absorbing section (not shown) where any remaining hydrocarbon fractions boiling in the gasoline range are recovered.

Reactivation of the catalyst is provided for by means of the reactivation system comprising line 30, through which nitrogen is fed, and line 38, through which air is admitted. Because it is essential to avoid bringing any appreciable amounts of water into contact with the catalyst, driers 31a and 31b are provided. These driers are mounted in parallel relationship to permit periodic reactivation of the desiccant without interrupting the flow system.

Before initiating regeneration, substantially dehydrated nitrogen is passed through line 32 and furnace 14 into reactor 15 to purge the reaction system of any residual hydrocarbons or hydrogen. The purge gases are removed from the system through lines 33 and 34 which pass to vent 35. This purging may also be effected by evacuating the system by means of steam ejector 36 which is connected to the system through line 37. After the reaction system has been purged, controlled amounts of substantially dehydrated air are introduced into the flowing nitrogen stream by means of air supply line 38, and the air-nitrogen mixture is passed through the reactor to oxidize the deactivated catalyst. This oxidation is carried out at about 500–1000° F. When the catalyst has been substantially completely oxidized, the reaction system is purged with air, or is evacuated using steam ejector 36 to remove residual oxygen and any water which may have been produced during the oxidation step. If evacuation is not employed, the system is purged with an inert gas and reduction of the catalyst to its pristine condition is then achieved by introducing hydrogen into the flow system through line 12. In the drawing, for simplicity, there are not shown pumps, heat exchangers, valves, by-passes, and other auxiliaries, the placement of which will be evident to those skilled in the art.

In addition, various modifications in the subject process as exemplified by the illustrative examples can be effected without departing from the scope of the instant invention as defined in the appended claims.

I claim as my invention:

1. A method of preparing a highly-active, reactivatable, virgin isomerization catalyst which comprises incorporating in an acidic mixed-oxides hydrocarbon cracking catalyst support about 2 to 8 wt. percent of a hydrogenating agent, calcining the catalyst at a temperature above about 900° F. and circulating a reducing gas thereover, thereby producing a catalyst composition with the hydrogenating agent in a reduced form, subjecting the reduced catalyst composition to an oxidizing atmosphere at a temperature of about 650°–850° F., for a time sufficient to oxidize completely the oxidizable constituents of the catalyst composition, and thereafter contacting the oxidized catalyst composition with substantially pure hydrogen at 650°–850° F. for a time sufficient to substantially completely reduce the hydrogenating agent thereon.

2. A method in accordance with claim 1 in which the catalyst support is a refractory acidic composite of silica and at least one refractory oxide of the group consisting of alumina, zirconia, titania, beryllia, chromia, and boria.

3. A method in accordance with claim 1 in which the catalyst support is an acidic silica-alumina composite containing 40–90% w. silica and 60–10% w. alumina.

4. A method in accordance with claim 3 in which the hydrogen used contains not more than 0.005 mol percent $O_2$ and 0.003 mol percent CO.

5. A method in accordance with claim 4 in which the oxidizing atmosphere used is of the group consisting of oxygen, air, and mixtures of inert gases and oxygen.

6. A method in accordance with claim 3 in which the hydrogenating agent is of the group consisting of group VIII metals; oxides of polyvalent metals of groups V, VI, and VII; and group VIII metal salts of oxyacids of polyvalent metals of groups V, VI, and VII.

7. A method of preparing a highly-active, reactivatable, virgin isomerization catalyst which comprises incorporating in a substituted refractory acidic mixed-oxides hydrocarbon cracking catalyst support about 2 to 8 wt. percent of a hydrogenating agent, calcining the catalyst at a temperature above about 900° F. and circulating a reducing gas thereover, thereby producing a catalyst composition with the hydrogenating agent in a reduced form, subjecting the reduced catalyst composition to an oxidizing atmosphere at a temperature of about 650°–850° F., for a time sufficient to oxidize completely the oxidizable constituents of the catalyst composition, subjecting the oxidized catalyst composition to evacuation to a pressure of not more than 10 mm. Hg while maintaining the same at 650°–850° F., and thereafter contacting the oxidized catalyst composition with hydrogen at 650°–850° F. for a time sufficient to substantially completely reduce the hydrogenating agent thereon.

8. A method in accordance with claim 7 in which the catalyst support is a refractory acidic composite of silica and at least one refractory oxide of the group consisting of alumina, zirconia, titania, beryllia, chromia, and boria.

9. A method in accordance with claim 7 in which the catalyst support consisting of a silica-alumina composite containing 40–90% w. silica and 60–10% w. alumina.

10. A method in accordance with claim 7 in which the hydrogenating agent is of the group consisting of group VIII metals; oxides of polyvalent metals of groups V, VI, and VII; and group VIII metal salts of oxyacids of polyvalent metals of groups V, VI, and VII.

11. A process for isomerizing a charge stock consisting essentially of n-paraffin hydrocarbons containing less than 8 carbon atoms per molecule in admixture with hydrogen at a hydrogen/hydrocarbon mol ratio of 0.5 to 6.0, a liquid hourly space velocity of 0.1 to 2.0, a pressure of 50–1000 p.s.i.g., and a temperature of 600°–750° F., by contact with a catalyst produced in the process defined in claim 1.

12. A process for isomerizing a charge stock consisting essentially of n-paraffin hydrocarbons containing less than 8 carbon atoms per molecule in admixture with hydrogen at a hydrogen/hydrocarbon mol ratio of 0.5 to 6.0, a liquid hourly space velocity of 0.1 to 2.0, a pressure of 50–1000 p.s.i.g., and a temperature of 600°–750° F., by contact with a catalyst produced in the process defined in claim 3.

13. A process for isomerizing a charge stock consisting essentially of n-paraffin hydrocarbons containing less than 8 carbon atoms per molecule in admixture with hydrogen at a hydrogen/hydrocarbon mol ratio of 0.5 to 6.0, a liquid hourly space velocity of 0.1 to 2.0, a pressure of 50–1000 p.s.i.g., and a temperature of 600°–750° F., by contact with a catalyst produced in the process defined in claim 7.

14. A process for isomerizing a charge stock consisting essentially of n-paraffin hydrocarbons containing less than 8 carbon atoms per molecule in admixture with hydrogen at a hydrogen/hydrocarbon mol ratio of 0.5 to 6.0, a liquid hourly space velocity of 0.1 to 2.0, a pressure of 50–1000 p.s.i.g., and a temperature of 600°–750° F., by contact with a catalyst produced in the process defined in claim 9.

15. A process in accordance with claim 11 in which the hydrocarbon charge stock is a light petroleum distillate.

References Cited in the file of this patent

UNITED STATES PATENTS

| | | |
|---|---|---|
| 2,687,370 | Henricks | Aug. 24, 1954 |
| 2,718,535 | McKinley et al. | Sept. 20, 1955 |

FOREIGN PATENTS

| | | |
|---|---|---|
| 487,392 | Canada | Oct. 21, 1952 |